United States Patent [19]

Jensen

[11] Patent Number: 5,214,765
[45] Date of Patent: May 25, 1993

[54] METHOD AND APPARATUS FOR EXECUTING FLOATING POINT INSTRUCTIONS UTILIZING COMPLIMENTARY FLOATING POINT PIPELINE AND MULTI-LEVEL CACHES

[75] Inventor: Eric H. Jensen, Livermore, Calif.

[73] Assignee: Sun Microsystems, Inc., Mountain View, Calif.

[21] Appl. No.: 908,655

[22] Filed: Jul. 2, 1992

Related U.S. Application Data

[63] Continuation of Ser. No. 401,021, Aug. 31, 1989, abandoned.

[51] Int. Cl.$^5$ .............................................. G06F 13/14
[52] U.S. Cl. .................................. 395/425; 395/550; 395/725; 364/DIG. 1
[58] Field of Search .............................. 395/400, 425; 364/200 MS, 900 MS

[56] References Cited

U.S. PATENT DOCUMENTS

| | | | |
|---|---|---|---|
| 3,718,912 | 2/1973 | Hasbrouck et al. | 364/200 |
| 4,445,174 | 4/1984 | Fletcher | 364/200 |
| 4,686,621 | 8/1987 | Keeley et al. | 395/575 |
| 4,763,294 | 8/1988 | Fong | 364/748 |
| 4,797,814 | 1/1989 | Brenza | 395/425 |
| 4,823,259 | 4/1989 | Aichelmann, Jr. et al. | 395/425 |
| 4,967,351 | 10/1990 | Zmyslowski et al. | 395/425 |
| 4,974,156 | 11/1990 | Harding et al. | 395/425 |
| 4,991,078 | 2/1991 | Wilhelm et al. | 395/375 |
| 5,003,462 | 3/1991 | Blaner et al. | 395/375 |
| 5,023,776 | 6/1991 | Gregor | 395/425 |

FOREIGN PATENT DOCUMENTS

| | | |
|---|---|---|
| 89301506.5 | 2/1989 | European Pat. Off. |
| 8227885 | 9/1982 | United Kingdom . |
| 8401095 | 1/1984 | United Kingdom . |

OTHER PUBLICATIONS

Conrad, et al., "A 50 MIPS (Peak) 32/64b Microprocessor" IEEE Intl. Solid–State Circuits Conf. Dig. Tech. Papers 36 ISSCC. 15 to 17 Feb. 1989, pp. 76–77 & 295.

*Primary Examiner*—Joseph L. Dixon
*Assistant Examiner*—Hiep T. Nguyen
*Attorney, Agent, or Firm*—Blakely Sokoloff Taylor & Zafman

[57] ABSTRACT

A primary, a secondary, and a tertiary cache, and a floating point pipeline having optimized complimentary characteristics are provided to a computer system for executing floating point instructions. The primary cache is direct mapped and having $n_1$ cache lines, each having a cache line size of $m_1$ floating point data word(s) and an access time of $t_1$ clock cycle(s), where $m_1$ and $t_1$ are both small integer greater than or equal to 1. The secondary cache is fully associative having $n_2$ cache lines, each having a cache line size of $m_2$ floating point data words and an access time of $t_2$ clock cycles, where $n_2$ is a small integer, $m_2$ is greater than $m_1$, and $t_2$ is a small integer greater than $t_1$. The tertiary cache has $n_3$ cache lines, each having a cache line size of $m_3$ floating point data words and an access time of $t_3$ clock cycles, where $m_3$ is greater than $m_2$ and $t_3$ is a small integer greater than $t_2$. The tertiary cache may be direct mapped or set associative. The a floating point pipeline has a fetching phase, a decoding phase, d delay phases requiring at least $t_1+t_2$ clock cycles, and at least one floating point execution phase.

9 Claims, 4 Drawing Sheets

| TAG FIELD | INFORMATION FIELD |
|---|---|
|  | 256 BYTES |

INTEGER PIPELINE

| TIME | $T_0$ | $T_1$ | $T_2$ | $T_3$ | $T_4$ | $T_5$ | $T_6$ |
|---|---|---|---|---|---|---|---|
| LOAD | FETCH | EXEC | ACCESS PRI $ | ACCESS PRI $ | ACCESS SEC $ |  |  |
| OTHER |  | FETCH | EXEC |  |  | ACCESS SEC $ |  |
| USE |  |  | FETCH | EXEC | ACCESS PRI $ |  | ACCESS SEC $ |

INTEGER PIPELINE

| TIME | $T_0$ | $T_1$ | $T_2$ | $T_3$ | $T_4$ | $T_5$ | $T_6$ |
|---|---|---|---|---|---|---|---|
| LOAD | FETCH | EXEC | ACCESS PRI $ | | ACCESS SEC $ | | |
| USE | | FETCH | INTERLOCK DELAY | EXEC | ACCESS PRI $ | | ACCESS SEC $ |
| USE | | | | FETCH | EXEC | ACCESS PRI $ | |

*FIGURE 4(b)*

METHOD AND APPARATUS FOR EXECUTING FLOATING POINT INSTRUCTIONS UTILIZING COMPLIMENTARY FLOATING POINT PIPELINE AND MULTI-LEVEL CACHES

This is a continuation of application Ser. No. 07/401,021, filed Aug. 31, 1989, now abandoned.

BACKGROUND OF THE INVENTION

1. Field of the Invention

This invention relates to computer system architecture and, more particularly, to a system architecture for cache based systems to improve the floating point performance of such systems.

2. History of the Prior Art

Caches are used in computer systems to speed the overall operation of the system. The theory of a cache is that a system attains a higher speed by using a small portion of very fast random access memory (RAM) as a cache memory along with a larger amount of slower main memory RAM. If data and instructions are called from main memory and placed in cache memory as they are required by the program, and if the system looks first to the cache to see if the information required is available there, then the system will usually find the information desired in the cache and will, consequently, operate at a speed as though it were made of mostly high speed cache memory. This occurs because, statistically, information in any particular portion of a process which has just been used is more likely to be required immediately than is other information which has not been recently used.

This assumption has proven true, in general, so that in a well designed caching system the information desired is found in the cache over ninety percent of the time. On the other hand, the assumption is most accurate when describing the operation of a cache with the instructions of a particular process and is least accurate when applied to the retrieval of data, especially scientific data. This appears to be true because of the nature of the particular information sought. For example, in executing a process instructions are often repeated over and over again to carry out a single operation. Data, on the other hand, appears to be less likely to be selected in such a manner without change. Moreover, scientific data is often stored in the form of floating point information which requires for its storage substantially more actual storage space than do individual instructions. For example, a floating point number may require a double word space for storage in a typical computer system. Moreover, the tendency of scientific programmers is to arrange data in large arrays. Typically such arrays require so much memory storage space that the entire array cannot be placed in the typical cache memory space of a typical computer system. For the foregoing reasons, cache based systems have not proven as capable in speeding the operation of computer systems used in the processing of scientific information, especially processing involving large amounts of floating point numbers.

SUMMARY OF THE INVENTION

It is, therefore, an object of the present invention to accelerate the operation of cached based computer systems used for processing floating point numbers.

It is another object of this invention to provide a computer system architecture capable of rapidly processing floating point numbers.

These and other objects of this invention are realized in a computer system which comprises a central processing unit, a primary data cache, a secondary data cache, and a tertiary cache, and in which the primary data cache is a direct mapped cache, and the secondary data cache is a fully associative data cache, the primary data cache having individual lines capable of storing a predetermined amount of information at least equivalent to one word length in the computer system, the secondary data cache having lines each capable of storing a significant number of storage words.

These and other objects and features of this invention will be better understood by reference to the detailed description which follows taken together with the several figures of the drawing in which like elements have been referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to both apparatus and to method steps for operating a computer in processing electrical or other (e.g. mechanical, chemical) physical signals to generate other desired physical signals.

DETAILED DESCRIPTION OF THE INVENTION

Figure 1:
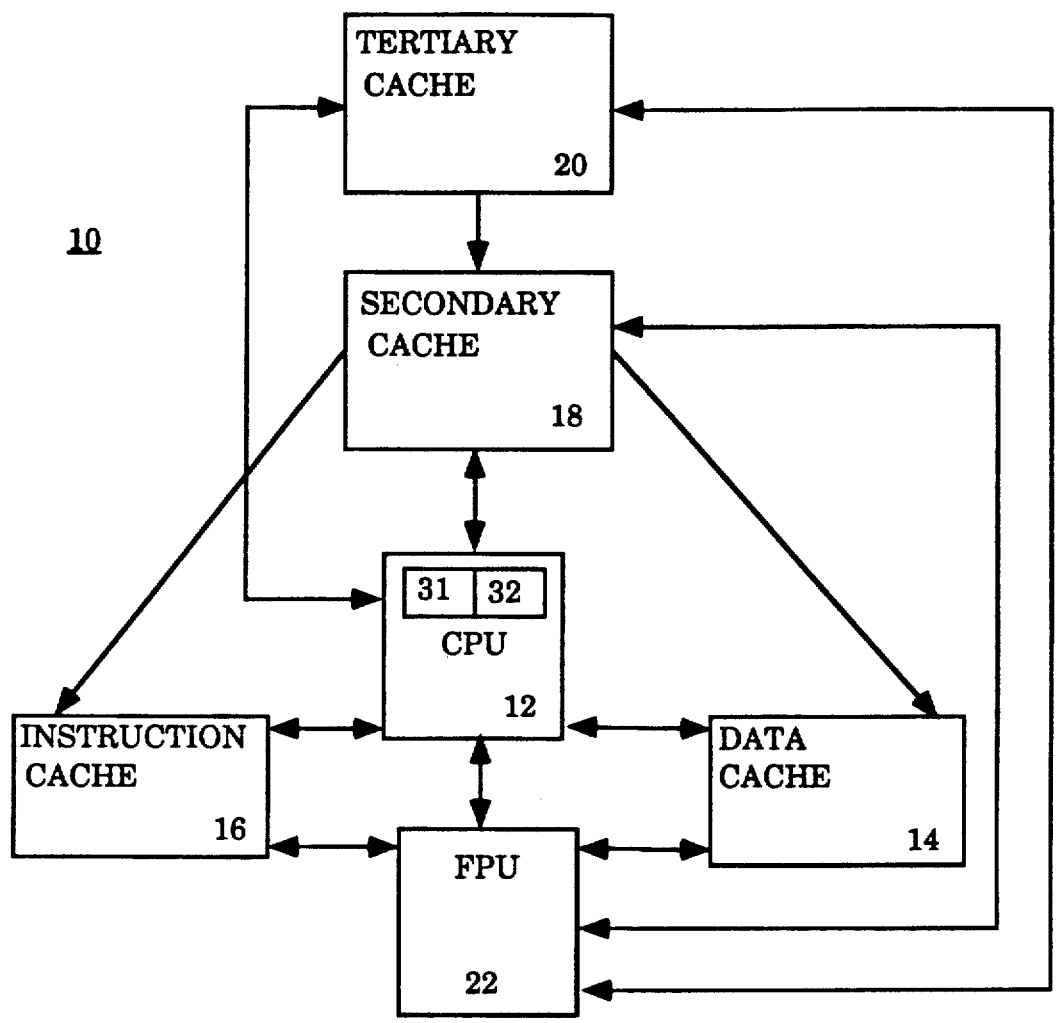
FIG. 1 is a block diagram illustrating a computer system designed in accordance with the invention.

Referring now to FIG. 1 there is shown a computer system 10 constructed in accordance with this invention. The computer system 10 includes a central processing unit (CPU) 12 which controls the operation of the system 10. Associated with the central processing unit 12 are a data cache 14 and an instruction cache 16. The data cache 14 and the instruction cache are referred to in the present description as primary caches. Each of these caches is essentially the same so reference will be made hereinafter (except where the explanation requires otherwise) to the data cache 14. Associated with the central processing unit 12 in the system 10 is a secondary cache 18. Also associated with the central processing unit 12 in the system 10 is a tertiary cache 20. The system 10 also incorporates a floating point processor 22 which is associated with the various caches of the arrangement and is essentially capable of independently processing floating point numbers in a manner well known to the prior art. In a preferred embodiment, the two primary caches 14 and 16 are direct mapped caches each containing storage space sufficient for eight kilobytes of information. In contrast, the secondary cache 18 is a fully associative cache providing storage space for four kilobytes of information. In contrast to both of the primary caches and the secondary cache, the tertiary cache 20 is capable of storing two megabytes of information and may be a direct mapped cache in the preferred embodiment of the invention. As will be described in greater detail in connection with FIG. 4b, CPU 12 includes a block 31 for delaying the execution of an instruction. CPU 12 also includes a block 32 for making the apparent time for accessing the primary and secondary caches generally equivalent, which will be described in greater detail in connection with FIG. 5.

Figure 2:
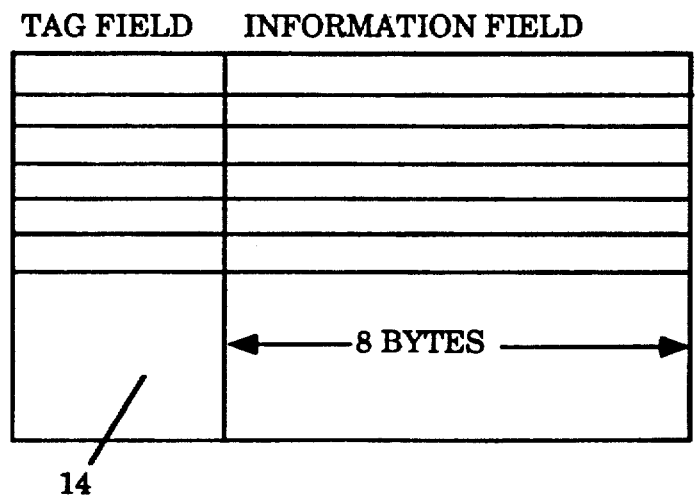
FIG. 2 is a block diagram illustrating the construction of the primary caches of the invention.

FIG. 2 illustrates in block diagram form the arrangement of one of the primary caches. The preferred embodiment of the system 10 is designed as a virtual memory system using a demand paged memory management arrangement. In such a system, main memory (not illustrated) is divided into a number of fixed blocks or pages of a predetermined size, height, and width; and primary cache memory is chosen to have the size of one of those pages so that main memory is essentially a multiple of primary cache memory size. Each page of main memory has a page address. Since each page of the main memory and of primary cache memory is of the same size, contains the same number of lines, and stores the same amount of information, any byte, word, or line in such a system may be addressed in main memory by designating its page number, its line, and its position on the line. When, in such a system, information from main memory is stored in such a primary cache memory, it is stored in the same line of the primary cache memory as the line of the page from which it was accessed in main memory together with its virtual page address in main memory. It should be understood that each line of the primary cache memory in such a system may come from any particular page of main memory. Consequently, lines lying adjacent each other in primary ache memory may have entirely different virtual page addresses. The virtual page address is stored as part of a tag field, a series of high order bits of the address which in addition to the page designation include protection and control information such as whether the information is read or write protected and whether the information is valid. In a preferred embodiment of the system 10, such a tag field may require approximately sixteen bits of storage to represent the tag information and is shown to the left in the cache memory 14 in FIG. 2.

A system 10 capable of accessing any line in primary cache memory may determine whether the required information is in the cache memory (whether there is a hit) by looking to the particular line designated in the address sought to determine whether the correct page number is stored in the tag field. The system determines the correct line by looking to the low order bits of the address sought (these designate the line and byte of the page in main memory from which the information came) and comparing these to the line number of the cache memory. If the virtual page address at the desired line in the cache memory matches the desired virtual page address, then there is a hit; and the information in the cache memory is used without the necessity of going to main memory. If the information is not present in the primary cache memory, then the system interrogates the other secondary and tertiary caches. If the information is not present in any of the cache memories, then the system must delay, go to main memory, replace the particular line in the primary cache memory so that the information may be used.

In the primary cache 14 illustrated in FIG. 2, in addition to the tag field shown to the left, information is stored from the particular page in memory in each line of the address. In the preferred embodiment, eight bytes of information are stored in each line; consequently, sixty-four individual storage bits are required for the information positions. Such an arrangement is one which may not conveniently be utilized to handle floating point information. Floating point information requires one double word or an entire line to store a single entry; and any particular array of floating point data may, in general, require much more storage space than that available in the primary caches.

Figures 3, 4A:
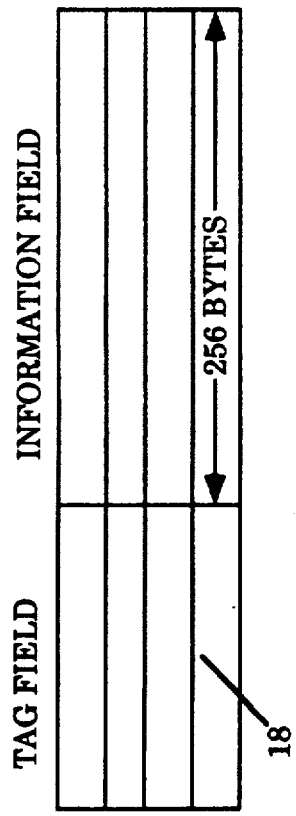
FIG. 3 is a block diagram illustrating the construction of the secondary cache of the system of this invention.
FIGS. 4(a) and (b) are diagrams illustrating various sequences of timing signals in the integer pipeline utilizing the computer system of this invention.

The secondary cache memory 18 shown in FIG. 3 is designed to obviate this problem. The secondary cache 18 is a fully associative cache having in the preferred embodiment sixteen lines each capable of storing a total of 256 bytes of information. Consequently, in each line of secondary cache 18 there is provision for thirty-two double words of data. A fully associative cache always holds the contents of the last X memory lines accessed by the central processing unit where X is equal to the number of lines in the fully associative cache memory. In a fully associative cache memory, any line may store information from any line in main memory so the tag field includes the entire address of the line. With each attempt to access the secondary cache, the tag field of each line is compared to the address desired and if a match is made the entire line is available to the central processing unit for utilization.

It will be noted that since each line of the secondary cache is capable of storing thirty-two double words, this provides room in each line for thirty-two individual floating point numbers sequentially arranged. It happens that this is the usual way in which floating point arrays are usually constructed. Consequently, the secondary cache memory 18 is much more able to deal with the large arrays utilized by programmers in scientific fields for the storage of floating point information. For example, a first access of the secondary cache which misses will cause the central processing unit to take an entire line of sixty-four sequentially arranged floating point numbers from main memory and store them in the secondary cache at one line. On the next attempt to access the secondary cache, the next sequential floating point number will be a hit, as will the next, and the next so long as the access asks for sequentially arranged numbers.

Although fully associative caches are normally not used where speed is required because it is difficult to address all cache positions in a short time, the small number of lines (sixteen in the secondary cache of the preferred embodiment) allows the practical use of a fully associative cache memory since only a small number of lines need to be interrogated to determine whether the information sought resides at the secondary cache 18.

In the arrangement illustrated in FIG. 1, the secondary cache 18 is associated with the tertiary cache 20 which is capable storing two megabytes of information. This cache is large enough to store large portions of arrays of floating point numbers used in scientific processing. Consequently, when used together with the secondary cache which is able to provide lines of thirty-two floating point numbers in a row which may be sequentially accessed without a cache miss, the combination substantially speeds the system operation.

The system illustrated in FIG. 1 utilizing the three levels of caching functions well to provide both data and instructions rapidly upon access by the central processing unit 12 and the floating point processor 22. For example, information in the two primary caches 14 and 16 is available to either of the two processors 12 and 22 in a single processing time because only a single clock time is required for the access once the operation has begun. The operation of accessing the secondary cache memory 18 requires an additional two clock times before access is begun but only a single processing time once the cache has been accessed. On the other hand, the operation to derive information from the tertiary cache memory requires two clock times before access is begun and a total of six clock times once access has been gained. Thus, although the primary caches may be accessed immediately, the additional times before access is begun of the secondary cache and the tertiary cache means that some delay is still inherent in the system even with the three levels of caching.

The system of the invention so far described may be made to operate substantially faster if used with its timing varied from that usual in pipelining systems. FIG. 4(a) illustrates a timing diagram showing the usual integer pipeline in a pipeline system. The diagram includes three lines of three instructions; a first load instruction, a second use instruction, and a third use instruction. It will be seen that each instruction includes a first fetch phase implemented by a program control unit of the CPU, a second execution phase implemented by the execution unit of the CPU, a third data access phase of the primary data cache by the data fetch unit of the CPU, and fourth data access phase of the secondary cache by the data fetch unit of the CPU. The fetch operation for the first instruction takes place at time T0. The execution phase for the first instruction which includes decode and execution and the initiation of the fetch from both the primary and the secondary caches takes place at time T1. The data is available from the primary cache at the end of time T4. This true of the normal execution of the second and third instructions as well except that the times for the second instruction are shifted by one clock period from the first, and the times for the third instruction are shifted by one clock period from the second.

If the second "use" instruction desires to use data produced in the load instruction, that data is not available from the primary cache until the end of time T2 while the use of the data should occur during T2. This is called an interlock condition, and causes the loss of substantial time in the system. If the data from the load instruction in to be used in instruction three, it is available at the beginning of the execution phase and no delay is incurred. In order to expedite the operation of the system and relieve interlock condition, the CPU provides a modified timing arrangement in the integer pipeline. In this modified timing shown in FIG. 4(b), the execution phase of the instructions is delayed by one time so that the data is always available from a hit in the primary cache for a use instruction which immediately follows a load instruction. If the information is not available in the primary cache, then the CPU detects the miss and causes the system to stall until the information becomes available either from the secondary or the tertiary cache. In this manner, the operation of the integer pipeline of the system using the invention is expedited.

In loading integer data, if the primary cache is accessed and a miss occurs but there is a hit in the secondary cache, then both the CPU and the primary cache are loaded. If misses occur in both the primary cache and the secondary cache, but a hit occurs in the tertiary cache, then the CPU, the primary cache, and the secondary cache are all loaded with the data.

The SPARC line of computers manufactured by Sun Microsystems, Inc., 2550 Garcia Ave., Mountain View, Calif. includes circuitry for accomplishing the timing arrangement described above.

Figure 5:
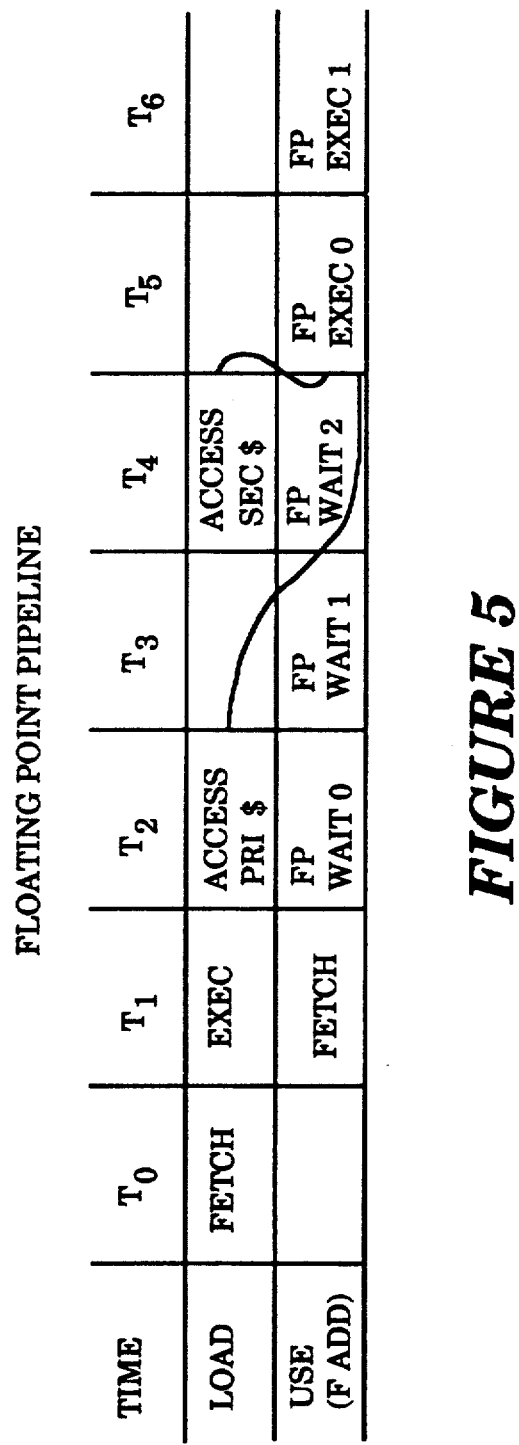
FIG. 5 is a diagram illustrating various sequences of timing signals in the floating point pipeline utilizing the computer system of this invention.

The timing for the floating point pipeline is somewhat different in order to make use of the long-lined secondary cache which is specially adapted to hold sequences of floating point numbers. FIG. 5 illustrates two instruction for implementing the floating point pipeline. The first instruction is a load instruction which is an integer type of instruction and is, consequently, arranged in the same manner as the first load instruction of FIG. 4(a). Since it is probable that the data sought in a floating point operation will be available in the secondary cache, the execution stage of the floating point use operation is delayed until both the primary data cache and secondary data cache accesses have occurred. The second instruction shown in FIG. 5 is an fadd "use" instruction. Its fetch occurs at time T1 and is followed by three wait times. At time T5, the execution phase begins. At this time, the data in the secondary cache has been accessed so that it is available to the floating point instruction. The instruction shown has two execution stages in order to allow for the execution of double floating point operations. Since execution is not attempted until data is available from both the primary and secondary caches, the apparent access time for both primary and secondary caches is the same; and the CPU need not stall the system. This substantially increases the speed of the system.

The operation for loading the caches in a floating point operation is somewhat different than for integer load because the execution phase of the instruction is rearranged so that the observed access time in the primary cache and the secondary cache is the same. If there is a miss in the primary cache and a hit in the secondary cache in a floating point operation, the primary cache is not filled; there is no reason to fill the primary cache in a floating point operation since the apparent time for accessing the primary and secondary caches in the same. On the other hand, if there is a miss in the secondary cache and a hit in the tertiary cache, both the primary cache and the secondary cache are filled.

Although the invention has been described in a preferred embodiment, it will be clear to those skilled in the art that many modifications may be made to the invention described without departing from the spirit and scope of the invention. For example, although the long delay to allow for access of the secondary cache has been demonstrated with regard to floating point operations, it might as well be applied to integer operations in the occasion for using information from the secondary cache arises. Moreover, any secondary memory which operates with an apparent pipelined cycle time near or equal to the processor cycle time might replace the secondary cache. It will, therefore, be appreciated that the invention should be considered to be particularly defined by the claims which follow.

What is claimed is:

1. In a pipelined computer system comprising a plurality of floating point instructions, a method for executing floating point instructions, said method comprising the steps of:
   a) storing a first plurality of floating point data in a primary direct mapped cache, said primary cache comprising $n_1$ cache lines, each having a first cache line size of $m_1$ floating point data word(s) and a first access time of $t_1$ clock cycle(s), where $m_1$ and $t_1$ are both small integers greater than or equal to 1;
   b) storing a second plurality of floating point data in a secondary fully associative cache, said secondary cache comprising $n_2$ cache lines, each having a second cache line size of $m_2$ floating point data words and a second access time of $t_2$ clock cycles, where $n_2$ is a small integer, $m_2$ is greater than $m_1$, and $t_2$ is a small integer greater than $t_1$.
   c) storing a third plurality of floating point data in a tertiary cache, said tertiary cache comprising $n_3$ cache lines, each having a third cache line size of $m_3$ floating point data words and a third access time of $t_3$ clock cycles, where $m_3$ is greater than $m_2$ and $t_3$ is a small integer greater than $t_2$;
   d) executing at least one fetching and one decoding floating point phase to fetch and decode a floating point instruction, said floating point instruction being preceded by a floating point data loading instruction to load at least one floating point data word from a selected one of said primary, secondary and tertiary cache;
   e) executing d floating point delay phases, said d floating point delay phases requiring at least $t_1 + t_2$ clock cycles; and
   f) executing at least one floating point execution phase to execute said decoded floating point instruction.

2. The method as set forth in claim 1, wherein,
$m_1$ and $t_1$ both equal 1;
$m_2$ equals 64 and $t_2$ equals 2; and
d equals 3.

3. The method as set forth in claim 2, wherein $n_2$ equals 16.

4. In a pipelined computer system comprising a plurality of floating point instructions, an apparatus for executing floating point instructions, said apparatus comprising:
   a) a primary direct mapped cache for storing a first plurality of floating point data in a primary direct mapped cache, said primary cache comprising $n_1$ cache lines, each having a first cache line size of $m_1$ floating point data word(s) and a first access time of $t_1$ clock cycle(s), where $m_1$ and $t_1$ are both small integers greater than or equal to 1;
   b) a secondary fully associative cache for storing a second plurality of floating point data in a secondary fully associative cache, said secondary cache comprising $n_2$ cache lines, each having a second cache line size of $m_2$ floating point data words and a second access time of $t_2$ clock cycles, where $n_2$ is a small integer, $m_2$ is greater than $m_1$ and $t_2$ is a small integer greater than $t_1$;
   c) a tertiary cache for storing a third plurality of floating point data in a tertiary cache, said tertiary cache comprising $n_3$ cache lines, each having a third cache line size of $m_3$ floating point data words and a third access time of $t_3$ clock cycles, where $m_3$ is greater than $m_2$ and $t_3$ is a small integer greater than $t_2$; and
   d) a floating point pipeline coupled to said primary, secondary, and tertiary caches for executing at least one fetching and one decoding floating point phase to fetch and decode a floating point instruction, d floating point delay phases, said d floating point delay phases requiring at least $t_1 + t_2$ clock cycles, and at least one floating point execution phase to execute said decoded floating point instruction, said floating point instruction being preceded by a floating point data loading instruction to load at least one floating point data word from a selected one of said primary, secondary and tertiary cache.

5. The apparatus as set forth in claim 4, wherein,
$m_1$ and $t_1$ are both equal 1;
$m_2$ equals 64 and $t_2$ equals 2; and
d equals 3.

6. The apparatus as set forth in claim 5, wherein $n_2$ equals 16.

7. A computer system comprising:
   a) a primary direct mapped cache for storing a first plurality of floating point data in a primary direct mapped cache, said primary cache comprising $n_1$ cache lines, each having a first cache line size of $m_1$ floating point data word(s) and a first access time of $t_1$ clock cycle(s), where $m_1$ and $t_1$ are both small integers greater than or equal to 1;
   b) a secondary fully associative cache for storing a second plurality of floating point data in a secondary fully associative cache, said secondary cache comprising $n_2$ cache lines, each having a second cache line size of $m_2$ floating point data words and a second access time of $t_2$ clock cycles, where $n_2$ is a small integer, $m_2$ is greater than $m_1$ and $t_2$ is a small integer greater than $t_1$;
   c) a tertiary cache for storing a third plurality of floating point data in a tertiary cache, said tertiary cache comprising $n_3$ cache lines, each having a third cache line size of $m_3$ floating point data words and a third access time of $t_3$ clock cycles, where $m_3$ is greater than $m_2$ and $t_3$ is a small integer greater than $t_2$; and d) a floating point pipeline coupled to said primary, secondary, and tertiary caches for executing at least one fetching and one decoding floating point phase to fetch and decode a floating point instruction, d floating point delay phases, said d floating point delay phases requiring at least $t_1+t_2$ clock cycles, and at least one floating point execution phase to execute said decoded floating point instruction, said floating point instruction being preceded by a floating point data loading instruction to load at least one floating point data word from a selected one of said primary, secondary and tertiary cache.

8. The computer system as set forth in claim 7, wherein, $m_1$ and $t_1$ are both equal 1;

$m_2$ equals 64 and $t_2$ equals 2; and d equals 3.

9. The computer system as set forth in claim 8, wherein $n_2$ equals 16.